Jan. 13, 1925.
W. V. McLIN
1,522,734
TRANSFORMER CASE
Filed June 4, 1923
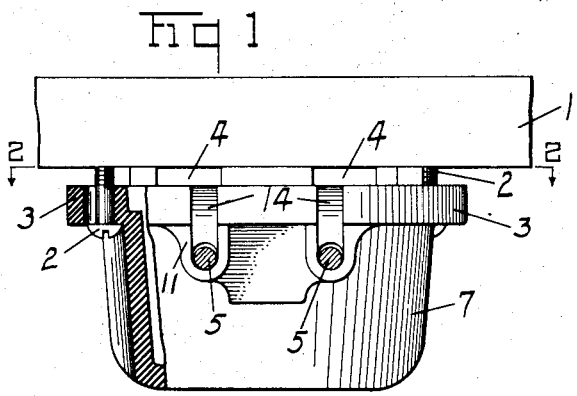
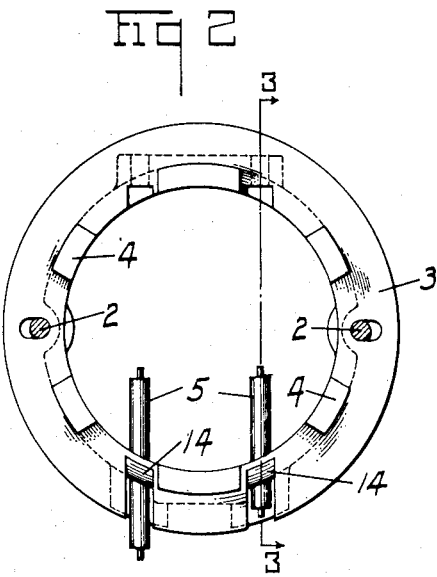
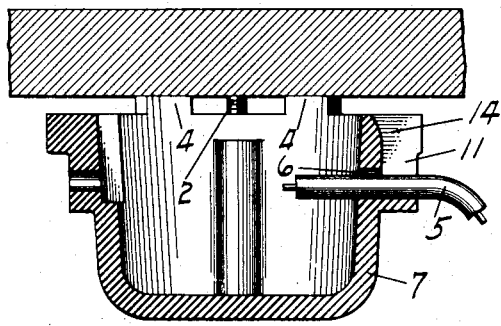
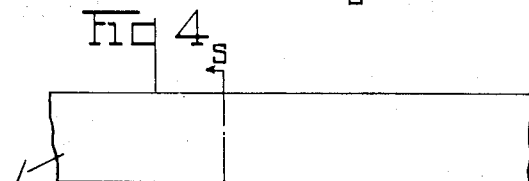
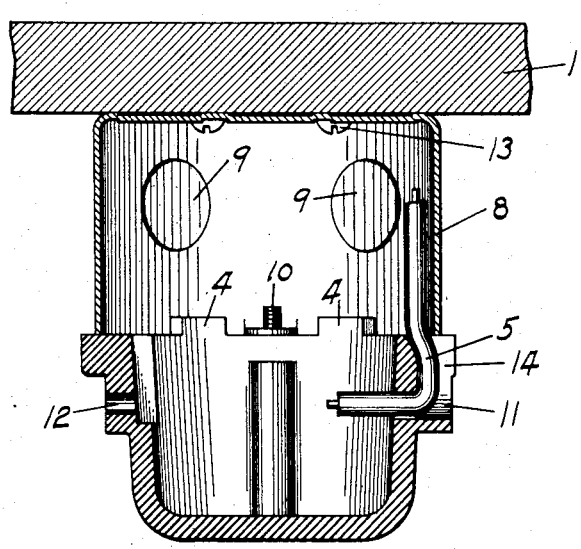
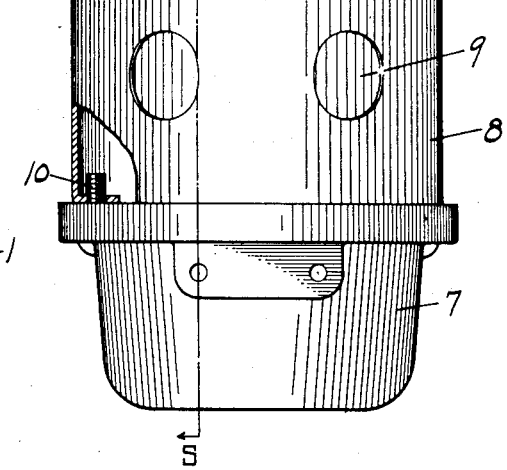
INVENTOR
Walter V. McLin.
by
Owen, Owen & Crampton Patented Jan. 13, 1925.

1,522,734

UNITED STATES PATENT OFFICE.

WALTER V. McLIN, OF TOLEDO, OHIO, ASSIGNOR TO MODERN ELECTRIC MANUFACTURING COMPANY, OF TOLEDO, OHIO, A PARTNERSHIP.

TRANSFORMER CASE.

Application filed June 4, 1923. Serial No. 643,222.

*To all whom it may concern:*

Be it known that I, WALTER V. McLIN, a citizen of the United States, and a resident of Toledo, in the county of Lucas and State of Ohio, have made an Invention Appertaining to a Transformer Case, which invention is fully set forth in the following specification.

My invention has for its object to provide a transformer case which is particularly designed for enclosing a small transformer. Such transformers are commonly used in dwelling houses and particularly for modifying the current of a line circuit to cause the ringing of a bell or buzzer or other signalling device. The case is preferably formed of porcelain, and the invention has for its object to so construct and shape the porcelain case that it may be secured directly to the wall or ceiling of the building or it may be secured to a terminal box which may be secured to some part of the building. Where the case is secured directly to some part of the building, the wires, particularly the line wires to the transformer, are so positioned at the point where they enter the case that they are located the distance prescribed by the underwriters from the wall or part of the building to which the case is thus directly connected. When the case is secured to a terminal box, such as a knock-out box, the line connections may be made in the terminal box and the wires leading to the case may be turned into the terminal box, the openings through which the wires extend being hooded by the porcellaneous material so as to protect the wires against short circuiting in the manner also prescribed by the underwriters. Thus my invention provides an adaptable porcellaneous transformer case to be used in dwelling houses wherein the line wires are protected from each other and the part of the building to which the case is directly or indirectly connected, as stated above.

The case containing the invention may be modified in its details without departing from the spirit of the invention. To illustrate a practical application of the invention I have selected a porcelain transformer case embodying the invention and shall describe it hereinafter. The case is illustrated in the accompanying drawings.

Figure 1 illustrates a side view, partly in section, of a case secured directly to a part of the building, such as a beam or raft or ceiling. Fig. 2 illustrates a top view of the case shown in Fig. 1. Fig. 3 is a sectional view taken on the line 3—3 indicated in Fig. 2. Fig. 4 is a side view of the case and a terminal box to which the case is connected. Fig. 5 is a sectional view taken on the line 5—5 indicated in Fig. 4.

In Figs. 1, 3, 4 and 5, 1 indicates a part of the building in which the porcelain case is located. In Figs. 1 and 3 the case 7 is directly connected to the supporting part 1 of the building or structure by means of the screws 2 that pass through openings formed in the flange 3 of the porcelain case. Suitable spacing lugs 4 are formed around the upper edge to permit the proper circulation of air and to space the transformer the required distance from the supporting part 1 of the structure. The line wires 5, leading to the transformer within the case, pass through holes 6. The holes 6 are located a half to three-quarters of an inch from the supporting structure 1 to prevent arcing between the wires and the supporting part of the structure, and consequently to prevent danger arising by reason of fire that might be caused therefrom.

Inasmuch as the terminal boxes are used for making connections or branches of connections in a dwelling house, it is often found desirable to secure the porcelain transformer case directly to the terminal box and use the case in place of the lid that is commonly used to close the terminal box. In Figs. 4 and 5 is shown the ordinary conventional knock-out terminal box 8 having the usual knock-out portions 9 through which branch connections may be made with the main line. The transformer case 7 is connected by screws 10 that pass up through the rim or flange 3. The lugs 4 are so formed that when the transformer case is drawn upwards by the screws 10 the flange 3 will be pressed against the edge of the terminal box 8 and the lugs 4 will be located within the box, which coacts to prevent shifting of the transformer case relative to the box if the screws 10 are not rotated sufficiently to draw the transformer case 7 up against the edge of the terminal box 8. The wires 5 are bent upwards before the transformer case is secured in position. The wires 5 are so bent so as to pass within the edge of the terminal box, the flange 3 being provided with notches or recesses 14 into which the wires 5 may be readily bent. The openings through which the wires 5 pass are hooded by the portions 11 of the porcellaneous material. The hooded portions 11 extend from the flange 3 and on opposite sides of the recesses into which the wires 5 may be bent and up over the openings into the transformer case through which the wires 5 extend, as particularly shown in Fig. 5. Thus the bend of the wires is protected from contact with external objects when the transformer case is connected to the terminal box since the wires lie wholly within the hooded portions of the transformer case.

The wires leading to the bell or other signalling device may pass out through the openings 12. Also the terminal box 8 may be secured to the supporting structure 1 by any suitable means, such as by means of the screws 13.

I claim:

1. A transformer case having a flanged rim and openings through which the leading-in-wires pass to the transformer, the flange having recesses located in proximity to the openings, hooded portions covering the said recesses and openings.

2. A transformer case having a flanged rim and openings through which the leading-in-wires pass to the transformer, the flange having recesses located in proximity to the openings, hooded portions covering the said recesses and openings, lugs located on the rim of the transformer case.

3. A transformer case having a flanged rim and openings through which the leading-in-wires pass to the transformer, the flange having recesses located in proximity to the openings, hooded portions covering the said recesses and openings, lugs located on the rim of the transformer case, means for securing the case to a part of the building.

4. A transformer case having a flanged rim and openings through which the leading-in-wires pass to the transformer, the flange having recesses located in proximity to the openings, hooded portions covering the said recesses and openings, lugs located on the rim of the transformer case, means for securing the case to a part of the building.

In testimony whereof, I have hereunto signed my name to this specification.

WALTER V. McLIN.